United States Patent
Littlejohn et al.

(10) Patent No.: US 11,936,536 B2
(45) Date of Patent: *Mar. 19, 2024

(54) METHOD AND DEVICE FOR EVALUATING THE SYSTEM ASSETS OF A COMMUNICATION NETWORK

(71) Applicant: RISC Networks, LLC, Asheville, NC (US)

(72) Inventors: Jeremy Lynn Littlejohn, Fairview, NC (US); Gregory Evan Watts, Nottingham, NH (US)

(73) Assignee: RISC Networks, LLC, Asheville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,279

(22) Filed: Oct. 25, 2021

(65) Prior Publication Data
US 2022/0124010 A1 Apr. 21, 2022

Related U.S. Application Data

(63) Continuation of application No. 16/192,592, filed on Nov. 15, 2018, now Pat. No. 11,159,394, which is a (Continued)

(51) Int. Cl.
*H04L 41/50* (2022.01)
*H04L 41/0853* (2022.01)
(Continued)

(52) U.S. Cl.
CPC ...... *H04L 41/5058* (2013.01); *H04L 41/0853* (2013.01); *H04L 41/12* (2013.01); *H04L 67/02* (2013.01); *H04L 2101/622* (2022.05)

(58) Field of Classification Search
CPC ..... H04L 41/12; H04L 41/50; H04L 41/0853; H04L 41/5058; H04L 67/02; H04L 2102/622; H04L 101/622
(Continued)

(56) References Cited

U.S. PATENT DOCUMENTS 7,711,751 B2 * 5/2010 Kelley .................. H04L 41/142
709/224
8,484,355 B1 * 7/2013 Lochhead ............. G06F 9/5077
709/222

(Continued)

FOREIGN PATENT DOCUMENTS

WO  WO 2011/067099 A2  6/2011
WO  WO 2012/027478 A1  3/2012
(Continued)

OTHER PUBLICATIONS

Breitbart Y, Garofalakis M, Jai B, Martin C, Rastogi R, Silberschatz A. Topology discovery in heterogeneous IP networks: the NetInventory system. IEEE/ACM Transactions on Networking (TON). Jun. 1, 2004;12(3):401-14 (Year: 2004) (Year: 2004).*
(Continued)

*Primary Examiner* — James N Fiorillo
(74) *Attorney, Agent, or Firm* — Knobbe, Martens, Olson & Bear, LLP

(57) ABSTRACT

There is provided a method a method for evaluating the system assets of a network that includes the steps of identifying system assets of the network and applying a heuristic that focuses on specific attributes of the communications relationships between the system assets of a network.

17 Claims, 3 Drawing Sheets

Related U.S. Application Data continuation of application No. 15/700,103, filed on Sep. 9, 2017, now abandoned, which is a continuation of application No. 14/494,697, filed on Sep. 24, 2014, now abandoned.

(51) Int. Cl.
*H04L 41/12* (2022.01)
*H04L 67/02* (2022.01)
*H04L 101/622* (2022.01)

(58) Field of Classification Search
USPC .......................................................... 709/223
See application file for complete search history.

(56) References Cited

U.S. PATENT DOCUMENTS

| | | | | |
|---|---|---|---|---|
| 8,667,138 B2* | 3/2014 | Ganesan | ............... | G06F 9/5072 709/224 |
| 8,751,627 B2 | 6/2014 | Liu et al. | | |
| 8,775,629 B1* | 7/2014 | Whittle | ............... | H04L 61/5092 709/245 |
| 9,225,483 B2* | 12/2015 | DeCusatis | ........... | H04L 12/4641 |
| 9,608,931 B2* | 3/2017 | Sharma | ................. | G06F 9/4856 |
| 9,985,847 B2 | 5/2018 | Tung et al. | | |
| 2004/0114580 A1* | 6/2004 | Santry | ................. | H04L 41/085 370/355 |
| 2006/0092861 A1* | 5/2006 | Corday | ............... | H04L 41/0893 370/256 |
| 2008/0080396 A1* | 4/2008 | Meijer | ................... | H04L 12/66 370/254 |
| 2008/0080552 A1* | 4/2008 | Gates | ...................... | H04L 12/66 370/468 |
| 2009/0119256 A1* | 5/2009 | Waters | ................. | G06F 16/9535 |
| 2009/0276526 A1* | 11/2009 | Carlson | ................ | H04L 63/101 709/225 |
| 2009/0276771 A1* | 11/2009 | Nickolov | ................ | G06Q 30/04 718/1 |
| 2010/0005505 A1* | 1/2010 | Gottimukkala | ....... | H04L 41/082 726/1 |
| 2010/0100778 A1* | 4/2010 | Sullivan | .............. | H04L 43/0817 709/224 |
| 2010/0125669 A1* | 5/2010 | Esfahany | .............. | G06F 9/5072 709/228 |
| 2010/0131592 A1* | 5/2010 | Zhang | ................. | H04L 67/1001 718/104 |
| 2010/0250642 A1* | 9/2010 | Yellin | ................. | G06F 11/3409 709/224 |
| 2010/0287263 A1* | 11/2010 | Liu | ..................... | H04L 63/1408 709/224 |
| 2010/0319004 A1* | 12/2010 | Hudson | ................ | G06F 9/5072 719/328 |
| 2010/0332401 A1* | 12/2010 | Prahlad | ............... | G06F 16/1844 711/E12.001 |
| 2010/0332615 A1* | 12/2010 | Short | ...................... | H04L 61/25 709/225 |
| 2011/0107327 A1* | 5/2011 | Barkie | ...................... | G06F 8/63 707/769 |
| 2011/0131335 A1* | 6/2011 | Spaltro | .................. | H04L 67/02 709/228 |
| 2011/0145094 A1* | 6/2011 | Dawson | ................ | G06Q 30/06 707/E17.014 |
| 2011/0231541 A1* | 9/2011 | Murthy | ................... | H04L 63/10 709/224 |
| 2011/0246376 A1* | 10/2011 | Devarakonda | ......... | G06Q 10/06 709/224 |
| 2011/0252420 A1* | 10/2011 | Tung | ..................... | G06F 9/5072 718/1 |
| 2012/0016721 A1* | 1/2012 | Weinman | ........... | G06Q 30/0206 705/7.35 |
| 2012/0060142 A1* | 3/2012 | Fliess | ................. | G06F 11/3457 717/102 |
| 2012/0096149 A1 | 4/2012 | Sunkara et al. | | |
| 2012/0109844 A1* | 5/2012 | Devarakonda | ....... | G06Q 10/067 705/348 |
| 2012/0131591 A1* | 5/2012 | Moorthi | ................. | G06F 9/5061 718/104 |
| 2012/0198073 A1* | 8/2012 | Srikanth | .................. | H04L 67/10 709/226 |
| 2012/0304179 A1* | 11/2012 | Devarakonda | ......... | G06Q 10/00 718/102 |
| 2013/0060933 A1* | 3/2013 | Tung | ................... | H04L 41/5003 709/224 |
| 2013/0067090 A1* | 3/2013 | Batrouni | ............. | H04L 67/1097 709/226 |
| 2013/0073614 A1* | 3/2013 | Shine | ........................ | G06F 8/20 709/203 |
| 2013/0091212 A1* | 4/2013 | Rajakarunanayake | ...................... | H04L 67/63 709/204 |
| 2013/0117157 A1* | 5/2013 | Iyoob | ..................... | G06Q 30/06 705/26.41 |
| 2013/0174168 A1* | 7/2013 | Abuelsaad | ....... | G06Q 10/06315 718/102 |
| 2013/0174277 A1* | 7/2013 | Kiukkonen | ........... | H04L 63/104 726/28 |
| 2013/0198386 A1* | 8/2013 | Srikanth | ................ | G06F 9/5061 709/226 |
| 2013/0227113 A1* | 8/2013 | Baras | .................. | H04L 41/0893 709/224 |
| 2013/0232254 A1* | 9/2013 | Srikanth | ................ | H04L 43/06 709/224 |
| 2013/0275574 A1* | 10/2013 | Hugard, IV | ............ | H04L 63/10 709/224 |
| 2013/0326038 A1* | 12/2013 | Bodik | .................... | G06F 9/4856 709/223 |
| 2013/0346619 A1* | 12/2013 | Panuganty | .............. | H04L 41/12 709/226 |
| 2014/0101279 A1* | 4/2014 | Nagami | ................... | G06F 3/061 709/213 |
| 2014/0122702 A1* | 5/2014 | Jung | ...................... | H04W 12/02 709/224 |
| 2014/0123135 A1* | 5/2014 | Huang | ................ | H04L 41/5054 718/1 |
| 2014/0149494 A1* | 5/2014 | Markley | ................. | H04W 4/60 709/203 |
| 2014/0229944 A1* | 8/2014 | Wang | .................... | G06F 9/5088 718/1 |
| 2014/0278808 A1* | 9/2014 | Iyoob | ................. | G06Q 30/0206 705/7.35 |
| 2014/0280848 A1* | 9/2014 | Modh | ................... | H04L 47/78 709/223 |
| 2014/0298091 A1* | 10/2014 | Carlen | ...................... | G06F 9/54 714/15 |
| 2014/0301192 A1* | 10/2014 | Lee | ......................... | H04L 41/40 370/230 |
| 2014/0337429 A1* | 11/2014 | Asenjo | .................... | H04L 67/10 709/204 |
| 2014/0359128 A1* | 12/2014 | Bhattacharya | ........ | G06F 9/4856 709/226 |
| 2014/0365662 A1* | 12/2014 | Dave | .................... | H04L 41/0893 709/226 |
| 2015/0043378 A1* | 2/2015 | Bardgett | ............... | H04L 41/122 370/254 |
| 2015/0127806 A1* | 5/2015 | Zizlavsky | ........... | H04L 41/0873 709/224 |
| 2015/0156065 A1* | 6/2015 | Grandhe | ............... | H04L 67/562 709/224 |
| 2015/0188919 A1 | 7/2015 | Belton et al. | | |
| 2015/0195182 A1* | 7/2015 | Mathur | ............... | G06F 11/2289 714/27 |
| 2015/0222702 A1* | 8/2015 | Salle | ................... | H04L 67/1095 709/201 |
| 2015/0222723 A1* | 8/2015 | Adapalli | ............... | G06Q 10/067 705/26.41 |
| 2015/0277856 A1* | 10/2015 | Payne | .................. | G06F 7/588 708/250 |

(56) References Cited

U.S. PATENT DOCUMENTS

| | | | | |
|---|---|---|---|---|
| 2015/0341230 | A1* | 11/2015 | Dave | G06Q 30/02 |
| | | | | 705/7.29 |
| 2016/0006616 | A1* | 1/2016 | Pacella | H04L 41/06 |
| | | | | 370/254 |
| 2016/0013992 | A1* | 1/2016 | Reddy | H04L 47/70 |
| | | | | 709/224 |
| 2016/0019636 | A1* | 1/2016 | Adapalli | H04L 67/10 |
| | | | | 705/26.81 |
| 2016/0142264 | A1* | 5/2016 | Sahi | H04L 41/12 |
| | | | | 370/254 |
| 2017/0026292 | A1* | 1/2017 | Smith | H04L 43/087 |
| 2017/0116626 | A1* | 4/2017 | Ramamoorthy | H04L 41/40 |
| 2017/0288978 | A1* | 10/2017 | Littlejohn | H04L 41/0826 |
| 2018/0124009 | A1* | 5/2018 | Kerkes | H04L 61/58 |
| 2019/0089604 | A1* | 3/2019 | Littlejohn | H04L 41/0853 |

FOREIGN PATENT DOCUMENTS

| | | |
|---|---|---|
| WO | WO 2012/102863 A2 | 8/2012 |
| WO | WO 2013/112833 A2 | 8/2013 |
| WO | WO 2013/192059 A2 | 12/2013 |

OTHER PUBLICATIONS

Breitbart et al. (A Topology discovery in heterogeneous IP networks: the NetInventory system. IEEE/ACM Transactions on Networking (TON). Jun. 1, 2004;12(3):401-14: (Year: 2004).*

Gui, Z., et al., "A Service Brokering and Recommendation Mechanism for Better Selecting Cloud Services." (2014).

* cited by examiner

METHOD AND DEVICE FOR EVALUATING THE SYSTEM ASSETS OF A COMMUNICATION NETWORK

RELATED APPLICATIONS

This application is a continuation application of U.S. application Ser. No. 16/192,592, filed Nov. 15, 2018, which is a continuation application of U.S. application Ser. No. 15/700,103, filed Sep. 9, 2017, which is a continuation application of U.S. application Ser. No. 14/494,697, filed Sep. 24, 2014.

BACKGROUND OF THE INVENTION

According to US Published Patent Application No. 2012166317 to Karnick et al, asset management systems are an important part of the management of the computer systems of a large enterprise. These systems provide an enterprise with the ability to manage configuration changes, providing better control over the computer software and hardware assets of the enterprise.

In a large enterprise, when an asset management product is initially deployed, a large number of assets such as server, desktop, and laptop computers must first be enrolled or registered with the product as managed entities. Depending on the capabilities of the asset management system, the registration of assets may be done manually or may be automated using a discovery tool, which may include software that automatically discovers physical and virtual assets.

The assets managed by such asset management systems are typically grouped into logical groups that may be managed collectively, reducing the complexity and costs of managing those grouped assets. However, according to US Published Patent Application No. 2012166317 to Karnick et al, creating logical groups of these IT (information technology) assets remains a manual task. Administrators may create and populate groups with individual IT assets based on some organization-specific criteria. In some asset management systems, administrations may define groups that are automatically populated based on rules involving IT asset attributes. In either case, some administrator is responsible for defining the groups or rules manually. In large enterprises, group definition is a hard task for individual administrators, and is likely to result in false positives (an IT asset incorrectly being assigned to a group) and false negatives (an IT asset incorrectly being omitted from a group). Even where groups are automatically populated, the correctness of those groups remains dependent on discovering and updating the right metadata or configuration data.

In addition, according to US Published Patent Application No. 2012166317 to Karnick et al, administrators typically create groups using simple criteria of which they are aware, e.g., operating system (OS) type or physical location. Other possible groupings, which may be more useful in some scenarios, may not be created because the administrator is unable to determine the proper criteria for defining the group. For example, the administrator may not be aware of which attributes are key to similarity among assets of a given type or there may not be any simple expression involving IT asset attributes that can be used to define a desired group. When IT asset management systems managed hundreds of IT assets, these manual groupings, while onerous, may have been feasible. However, notes US Published Patent Application No. 2012166317 to Karnick et al, where such systems may be managing tens of thousands of IT assets, manual grouping is at best very difficult, and often infeasible with any degree of accuracy and, according to US Published Patent Application No. 2012166317 to Karnick et al, IT asset management systems have frequently produced suboptimal groups.

However, beyond the challenges of producing more optimal groups of IT assets to facilitate management of IT resources, there is the challenge of producing meaningful information for administrators to effectively manage the IT resources. Even a relatively coherent, highly logical sorting out of IT assets into groups or classifications can still result in an unwieldy density of information that hinders, rather than facilitates, the management tasks of an administrator. Thus, the need still exists for a method for evaluating the IT assets of a network or networks that provides meaningful information in a readily accessible manner or an easily digestible manner to be used by an IT administrator or another person acting as a network operator and involved in network planning and management.

US Published Patent Application No. 2011/0246376 to Devakondra et al points out that network data processing systems are used for a variety of different purposes and come in a number of different forms. Several types of network data processing systems are commonly used by companies and other organizations and may include, for example, local area networks, wide area networks, virtual private networks, and other suitable types of networks. In addition to such networks that may be maintained by the network operator itself, cloud services are available and the users of this type of network data processing systems neither own nor manage the physical infrastructure.

According to US Published Patent Application Number 2011/0270968 to Salsburg et al, the term "cloud computing" generally refers to a model that makes computing resources available over a network as services. There are many factors to consider before an organization moves a computing workload to a public or private cloud. For example, according to US Published Patent Application Number 2011/0270968 to Salsburg et al, there is a need to validate business applications (workloads) in terms of technical portability and business requirements/compliance so that the workloads can be deployed into a cloud without considerable customization. Conventionally, according to US Published Patent Application Number 2011/0270968 to Salsburg et al, this validation is accomplished using a manual, time consuming process for workload identification, workload classification, and cloud provider assessment to find the 'best-fit' for business workload hosting.

Organizations that employ more traditional types of network data processing systems may contemplate whether to change over from their more traditional network environment to a cloud network environment. In view of the fact that the particular cloud services offered by each cloud service provider or vendor will have different features, benefits, service operating requirements, and costs, it would be advantageous for a network operator to have access to tools that can help guide a decision to migrate computing tasks to a cloud. Moreover, it would be advantageous if such tools for a guiding a network operator could equip the network operator to have an accurate picture of the computing resources in its own network that will or can be replaced by the cloud computing resources. Furthermore, network operators can make better informed decisions about purchasing cloud services if they can get pricing information about potential cloud service providers and, especially, pricing information about the scope of computing resources that tasks could be taken over in a cloud service arrangement.

SUMMARY OF THE INVENTION

One object of the present invention is to provide a method for evaluating the system assets of a network and, particularly, a method for evaluating "critical interfaces" of the system assets of the network.

A further object of the present invention is to provide a tangible computer-readable medium for storing instructions for controlling a computing device to generate an output, the instructions controlling the computing device to perform steps including the steps of identifying system assets of the network and applying a heuristic that focuses on specific attributes of the communications relationships between the system assets of a network.

In connection with further details of the step of identifying system assets of the network, the system assets to be evaluated can include only network devices, only entity applications or both network devices and entity applications. In connection with further details of the step of applying a reference group heuristic, this step may involve applying a reference group heuristic to determine if an identified network device is in the reference group, wherein an identified network device is deemed to be in the reference group if the identified network device has a non-intermediated communication relationship with two or more other network devices.

According to optional features of the method of the present invention, the method may further include the step of assessing data relating to the reference group relative to a selection of migration scenarios each of which is a scenario wherein some or all of the functions performed by some or all of the system assets would instead be performed externally of the network. Furthermore, the method may optionally include generating a migration consideration set comprised of cost information units that each include cost information about one of the migration scenarios.

Other aspects, embodiments and advantages of the present invention will become apparent from the following detailed description which, taken in conjunction with the accompanying drawings, illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which.

DETAILED DESCRIPTION OF AN EMBODIMENT OF THE INVENTION

Figure 1:
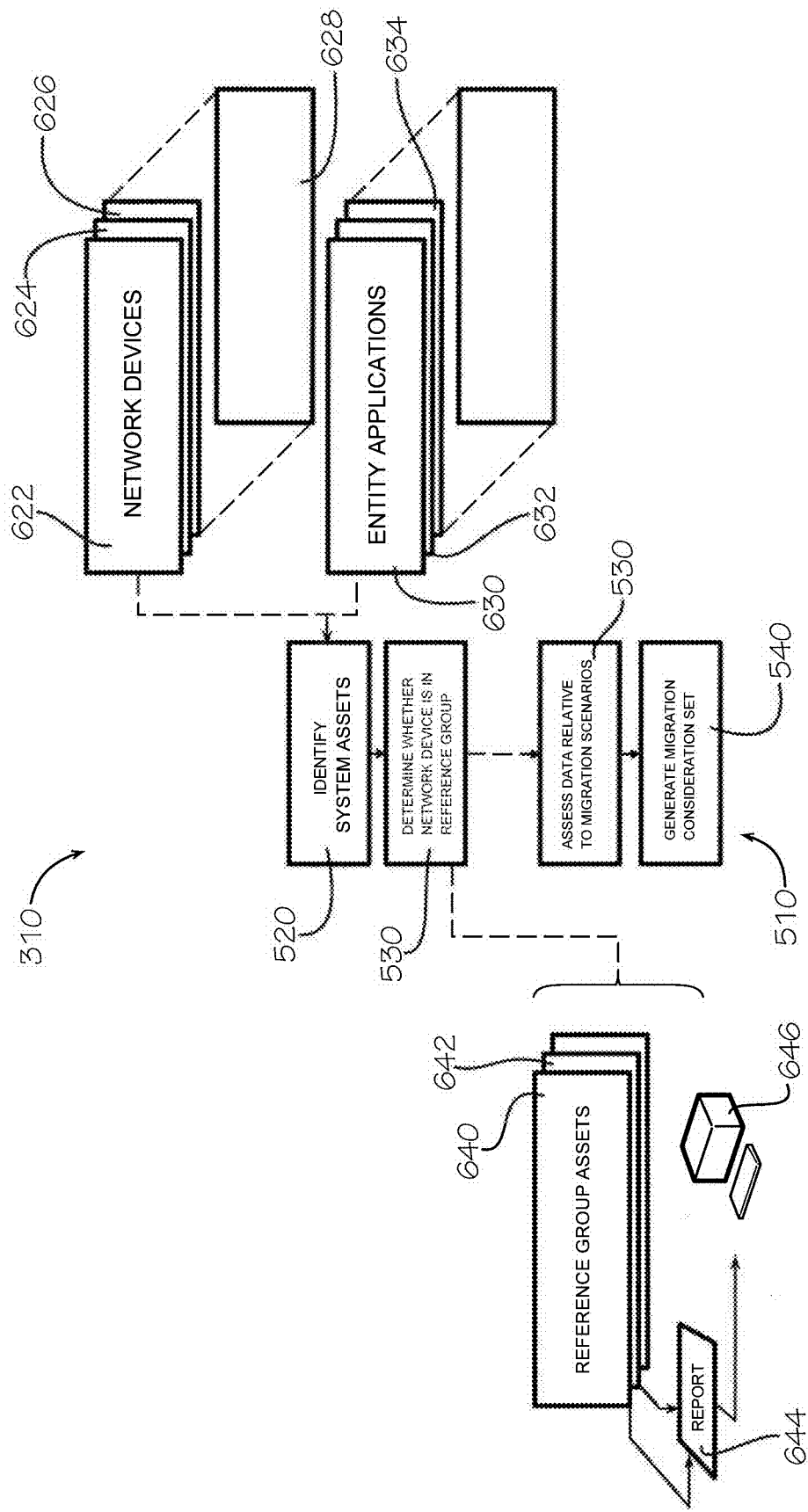
FIG. 1 is a schematic illustration of one possible sequence of steps that may be performed to implement the critical interface evaluating method of the present invention.

In accordance with the present invention, there is provided a method for evaluating the system assets of a network and, particularly, a method for evaluating "critical interfaces" of the system assets of the network. Reference is had to FIG. 1, which is a schematic illustration of one possible sequence of steps that may be performed to implement the critical interface evaluating method of the present invention, and the following description of the critical interface evaluating method and an arrangement for implementing the method on a computer. The critical interface evaluating method, which is hereinafter referred to as the critical interface evaluating method 310, can provide a network operator with tools to guide decisions about managing, adjusting, growing, or altering an IT arrangement and can provide the network operator with tools for considering and implementing a migration of computing tasks to an alternative task performer such as a private cloud computing resource or a public cloud computing resource and tools for automatically effecting the migration of selected computing tasks to an alternative task performer.

Figure 2:
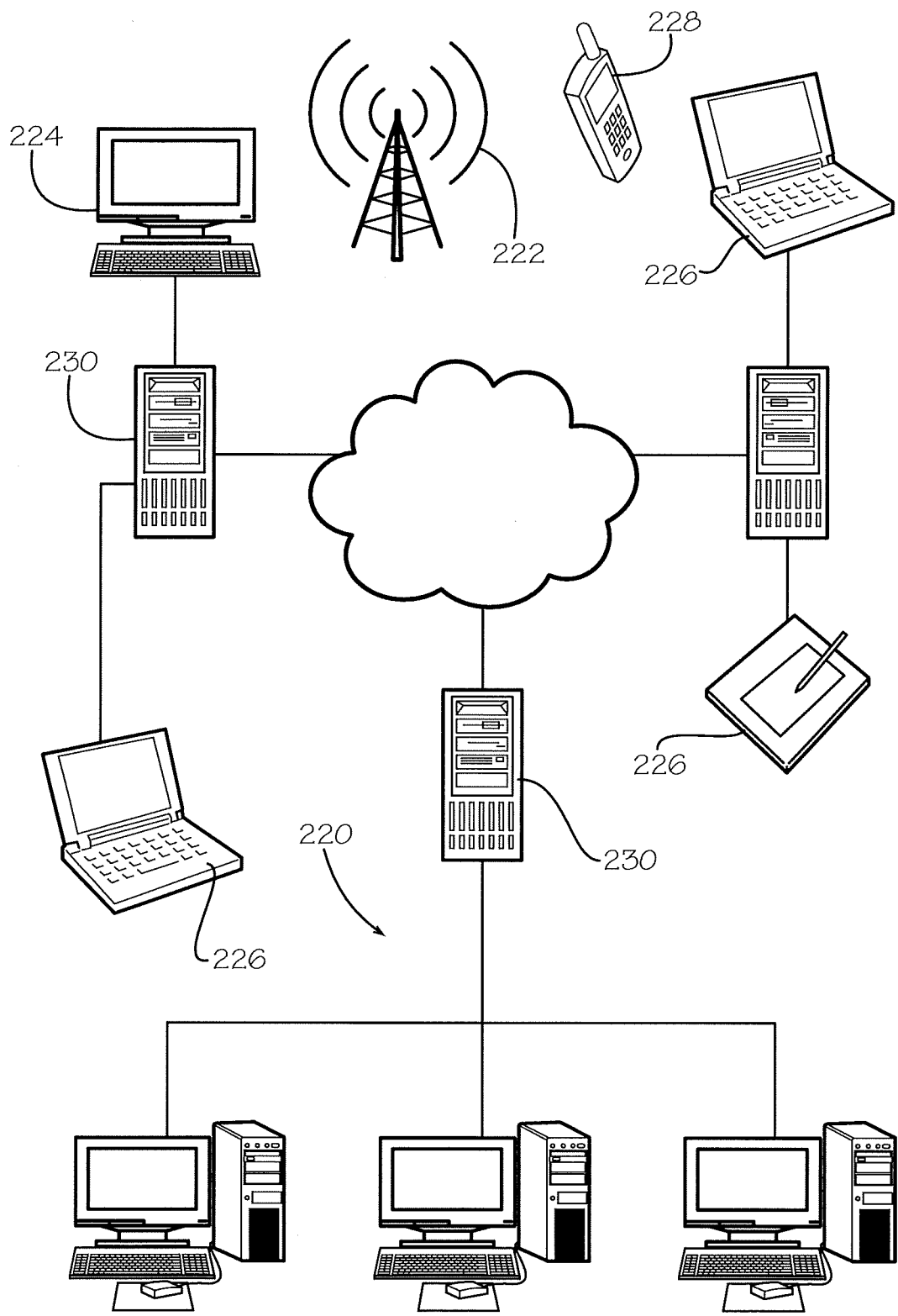
FIG. 2 is a schematic illustration of an exemplary network about which the method of the present invention can provide can provide rapidly understandable and pertinent information for use by the network operator in making decisions about migrating computing tasks to an alternative task performer such as a private cloud computing resource or a public cloud computing resource.

The term "critical interfaces" as used herein means those system assets that receive and transmit communications—thus, broadly speaking, "interfaces"—about which it is "critical" that a network operator can monitor in the event that the network operator wants to receive an easily digested, winnowed down yet accurate understanding of the health of the IT system. The "interfaces" identified to the network operator as "critical interfaces" mayor may not be more essential to the network than other interfaces of the network. Instead, the "criticality" implied by the term "critical interfaces" relates to the value and significance that information about such "critical interfaces" contribute to simplifying and resolving the tasks of monitoring the health of the network and, additionally, planning and implementing the growth or reconfiguration of the network. "Cloud computing" refers to the accessing of computing resources and data via a network infrastructure, such as the Internet. The computing resources and data storage may be provided by linked data centers of the "cloud,"—i.e., a "cloud" network. Each of the data centers may include a plurality of servers that provide computing resources, as well as data storage and retrieval capabilities. As used herein, "cloud service providers" refers to the owners or operators of the data centers that operate the "cloud" networks With reference now to FIG. 2, which is a perspective schematic view of a network, the critical interface evaluating method 310 will be described in further detail including how the critical interface evaluating method 310 can be performed to evaluate the representative network shown in FIG. 2. As seen in FIG. 2, a representative or exemplary network 220 is to be understood as representing any information technology or "IT" arrangement operable to store, manipulate, and present information to the network operator. As seen in FIG. 2, the exemplary network 220 can comprise components enabling the network to operate as a local area network, a wide area network such as the Internet, and/or a wireless network operable to receive a wireless signal from a transmitter 222. The computers comprised by the network 220 may include desktop computers 224, lap-top computers 226, hand-held computers 228 (including wireless devices such as wireless personal digital assistants (PDA) or mobile phones), or any other type of computational arrangement of hardware and/or software. The several computers may be connected to the network 220 via a server 230. It should be noted that any other type of hardware or software may be included in the system and be considered a component thereof.

The critical interface evaluating method 310 can be deployed to evaluate the system assets of any network that can broadly be considered to be a communications network in that the network routes and handles communication signals and such a network can be configured as a wireless network or a wired network, or a combination wireless and wired network. In the context of the network being configured as a computer network, the network can include an entirely hardware inventory of assets, an entirely software inventory of assets, or an inventory of software and hardware assets. As is well known, a computer network may be a virtual network in that a hardware asset hosts a plurality of virtual machines (VMs), each virtual machine operating as a stand alone computer and providing a characteristic computer device function such as a server function or a storage function. The host hardware asset typically includes a management entity, often called "hypervisor," that controls and manages different virtual machines.

Figure 3:
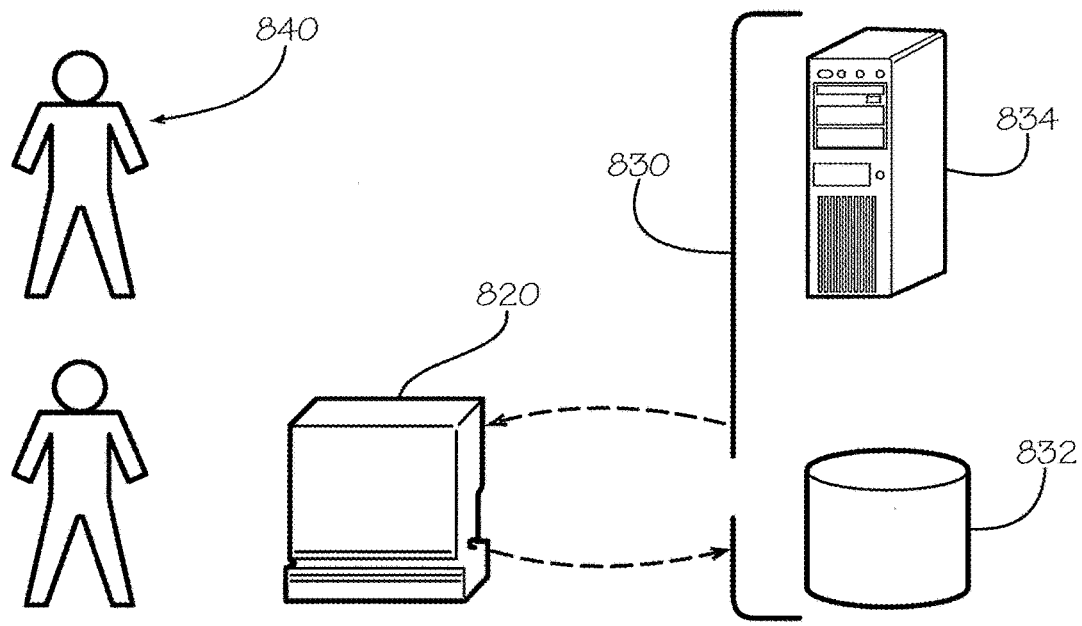
FIG. 3 is a schematic view of a portion of the network shown in FIG. 2.

As seen in FIG. 3, which is a schematic view of a portion of the network, the network 220 may include a virtualization capability that is implemented in a known manner via an emulated hardware environment. A hypervisor 820 is operatively connected with hardware exemplarily designated as a device group 830 so that virtualization of the device group 830 is provided without an operating system. The hypervisor 820 controls access to the device group 830 to a plurality of users 840. The device group 830 can include, for example, a storage device 832 and a processor 834 and these devices are herein designated as a type of system assets of the network called "network resources." The term "network resources" as used herein refers to devices that are operable to distribute communication signals that transit to and between these network resources with each network resource having a transit relationship with a communication signal in that the network resource may originate a communication signal and/or receive a communication signal. Also, the system assets of the network additionally include "entity applications" which are applications that direct distributions of communication signals to and between several of the system assets. Thus, the hypervisor 820 and the devices of the device group 830 may be fully or partially controlled by entity applications. With virtualization, a device can host a number of virtual machines via virtualization with each virtual machine functioning as a stand alone computer and offering any number of classic device functions such as server, storage, and other device functions.

The critical interface evaluating method 310 is configured for use with a network which, as schematically shown in FIG. 2, is designated as the in-place network 220 and which is to be understood as representing any communication network, information technology network or "IT" arrangement operable to store, manipulate, and present information to the network operator. As seen in FIG. 2, the in-place network 220 can comprise components enabling the network to operate as a local area network, a wide area network such as the Internet, and/or a wireless network operable to receive a wireless signal from a transmitter 222. The computers comprised by the network 220 may include desktop computers 224, lap-top computers 226, hand-held computers 228 (including wireless devices such as wireless personal digital assistants (PDA) or mobile phones), or any other type of computational arrangement of hardware and/or software. The several computers may be connected to the in-place network 220 via a server 230. It should be noted that any other type of hardware or software may be included in the system and be considered a component thereof.

The in-place network 220 schematically illustrated in FIG. 2 includes network devices that are operable to distribute communication signals that transit to and between these network devices. Each network device has a transit relationship with a communication signal in that the network device may originate a communication signal and/or receive a communication signal. Communication signals can be in any form as is known in the art, including, as an example of a non-binary information signal, wireless radio wave signals or, as an example, of a binary information signal, "packets", which is intended to mean the discrete collection of information typically referred to by this term with respect to signals handled by computer hardware devices. The handling of a packet by a network is typically governed by a set of rules that defines its structure and the service it provides. As an example, the World Wide Web has a standard protocol referred to as the Hyper Text Transport Protocol (HTTP) and this standard protocol dictates how packets are constructed, how data is presented to web servers, and how these web servers return data to client web browsers. Any application that transmits data over a computer network uses one or more protocols. There are typically numerous protocols in use between computers on a network.

The network devices of the in-place network 220 are shown, solely for the sake of illustration, as including hardware assets in the form of routers, switches, servers operable to run Windows™ brand software, workstations operable to run Windows™ brand software, Linux/Unix servers, hosts operable to run VMware™ software, terminals, hubs, branches, intersections, and bridges.

The in-place network 220 includes entity applications that direct discrete distributions of communication signals between several network devices. An "entity application" is a term used in this specification to refer to any form of application run on a network and may include a group of software assets that operate cooperatively with each other to provide a processing function or may include a single software asset, proprietary to the entity operating the network or bought or leased by the entity, that provides a processing function. An "entity application" may include commercially available applications such as, for example, Windows" brand software, Linux™ software, or VMware™ software, any form of freeware or shareware, or any form of custom software proprietary to, or licensed by, the network operator.

The critical interface evaluating method 310 includes the step of identifying system assets of the network, wherein the system assets to be evaluated can include only network devices, only entity applications or both network devices and entity applications. In this context, the network devices are devices that are operable to distribute communication signals that transit to and between themselves and other network devices with each network device having a transit relationship with a communication signal in that the network device may originate a communication signal and/or receive a communication signal and the entity applications are applications that direct distributions of communication signals to and between several of the system assets. The critical interface evaluating method 310 also includes, with regard to the network devices that have thus been identified, the step of applying a reference group heuristic to determine if an identified network device is in the reference group, wherein an identified network device is deemed to be in the reference group if the identified network device has a non-intermediated communication relationship with two or more other network devices.

The present invention capitalizes on the unobvious insight that meaningful information about a network can be gathered and subsequently presented in a readily accessible manner or an easily digestible manner by employing a heuristic that focuses on specific attributes of the communications relationships between the system assets of a network, wherein the occurrence of such specific attributes among some of the communications relationships between system assets but not others is not purposely driven by a goal of satisfying the heuristic but, instead, happens due to other factors. In other words, the method of the present invention makes use of the presence or absence of a characteristic (i.e., specific attributes of the communications relationships between the system assets of the network) that the network possesses by a happenstance that is not related to facilitating the selection or grouping of certain system assets apart from the remainder of the system assets.

One example of a specific attribute of the communications relationships between the system assets of the network that is suitable for use in connection with the method of the present invention is the attribute that each network resource, which, as defined herein, is a device or a piece of physical hardware, has an address that is referenced to establish communication between the device or piece physical hardware and another device or piece of physical hardware. An example of such an address is a MAC address. A MAC address, or Media Access Control address, is a 48- or 64-bit address associated with a network adapter, the network adapter being a device which connects a computer or device to the network. In effect, a MAC address is a unique code permanently assigned to a specific item of network hardware, such as a network device. An IP address, on the other hand, is an address associated with software. A MAC address IS sometimes referred to as a hardware address, a physical address, or a burned-in address.

In view of the fact, then, that all or substantially all, of the devices of a network have a MAC address, it can be readily understood that creating an inventory or a topology representation of all of the devices of a network having a MAC address merely provides an unfocussed view to A network operator of the health or capacity of a network. Information about the operation, location, or interconnections of many of the thus inventoried network devices may be largely irrelevant or meaningless with regard to an attempt to accurately assess the health or capacity of the network. So it can be understood that there exists no obvious reason to take into account the MAC addresses of a network in attempting to more accurately assess the health or capacity of the network.

However, the present invention relies upon the serendipitous discovery that certain aspects of the MAC addresses of a network can, in fact, be taken into account in order to yield a useful overview of the health or capacity of the network while optimally minimizing the density of information that needs to be evaluated. To this end, in accordance with the method of the present invention, the present invention takes into account certain aspects of the MAC addresses of a network in connection with the degree to which a respective network device has a particular communication relationship to a predetermined number or count of other network devices. In connection with one aspect of the present invention, the method of the present invention evaluates whether a respective network device has a particular communication relationship to a predetermined number or count of other network devices, wherein the relevant communication relationship is the degree and manner in which the respective network device has a "non-intermediated communication relationship" with a predetermined number or count of other network devices. A "non-intermediated communication relationship" is herein defined as a communication link between the respective network device and another network device in which (a) there is no other network device that is operationally intermediate the respective network device and the respective other network device or (b) there is another network device that is operationally intermediate network device does not have a MAC address.

In connection with further details of this one aspect of the present invention, the method of the present invention evaluates the circumstance of whether a respective network device has a non-intermediated communication relationship to a predetermined number or count of other network devices, wherein the predetermined number or count of other network devices is two or more other network devices. In connection with still further details of this one aspect of the present invention, the critical interface evaluating method 310 evaluates whether a respective network device has a non-intermediated communication relationship to a predetermined number or count of other network devices, wherein the predetermined number or count of other network devices is three or more other network devices.

As noted, the critical interface evaluating method 310 includes the step of identifying system assets of the network and the step of applying a reference group heuristic. In the context of making use of MAC addresses in an advantageous manner to evaluate a network, the step of the method of applying a reference group heuristic could include, for example, structuring the reference group heuristic so that an identified network device is deemed to be in the reference group if the identified network device itself has a MAC address and, additionally, has a non-intermediated communication relationship with two or more other network devices that themselves each have a MAC address.

Referring further to FIG. 1, it is to be understood that the steps of the critical interface evaluating method 310 can be performed, within the scope of the present invention, in a batch manner, wherein some, but not all, of the system assets are identified to form a first subset of identified system assets and then this subset of system assets is evaluated via the step of applying the reference group heuristic, with further subsets of system assets being identified and evaluated in series or in parallel. Alternatively, the steps of the critical interface evaluating method 310 can be performed, within the scope of the present invention, in a single cohort manner, wherein all of the system assets are identified to form a set of identified system assets and then these system assets are evaluated via the step of applying the reference group heuristic. As seen in FIG. 1, the critical interface evaluating method 310 includes a step 520 of includes identifying system assets of the network, the system assets including one or both: (1) network devices that are operable to distribute communication signals that transit to and between these network devices with each network device having a transit relationship with a communication signal in that the network device may originate a communication signal and/or receive a communication signal and (2) entity applications that direct distributions of communication signals between several network devices. For the sake of illustration, network devices are schematically shown in FIG. 1 in the form of a server 622, a shared uplink 624, a switch 626, and a router 628 and entity applications are schematically shown in FIG. 1 as a virtualization application 630, an accounting application 632, and a spreadsheet application 634.

The set of identified system assets created via the step 520 can be stored in any suitable storage format and can be optionally displayed or not displayed in human-readable format. Moreover, the inventory collection may be created via any suitable inventory collection approach including, for example, via network discovery techniques capable of discovering system assets in an existing network, via reference to a previously-generated inventory collection, or via estimates of the presence or absence of the system assets of the network. Known techniques such as SMNP inventory collection can be used.

The critical interface evaluating method 310 further includes a step 530 of applying a reference group heuristic to determine if an identified network device is in the reference group, wherein an identified network device is deemed to be in the reference group if the identified network device has a non-intermediated communication relationship with two or more other network devices. As can be appreciated, the critical interface evaluating method 310 can advantageously provide insights into the performance of the in-place network 220 and these performance insights can be leveraged to assist the operator of the in-place network 220 to make information technology (IT) management decisions such as, for example, decisions relating to replacing or upgrading system assets and including decisions about replacing some or all of the functionality of system assets via migration of selected network functions to a location external of the network—i.e., migration to a public or private cloud. As an example of the feature of performing the critical interface evaluating method 310 to assist in a cloud migration decision, further reference is had to FIG. 1, wherein it can be seen that the critical interface evaluating method 310 may optionally include a step 530 of assessing the data relative to a selection of migration scenarios each of which is a scenario wherein some or all of the functions performed by some or all of the system assets were instead to be performed at a location external to the network. Furthermore, as an example of the value to a network operator of performing the step 540 of assessing data about the reference group or reference groups relative to a selection of migration scenarios, it can be further seen in FIG. 1 that the critical interface evaluating method 310 can also optionally include a step 540 of generating a migration consideration set comprised of cost information units that each include cost information about one of the migration scenarios.

In connection with the step 530 of assessing the traffic analytics data relative to a selection of migration scenarios and the step 540 of generating a migration consideration set comprised of cost information units, the migration consideration set may optionally include a plurality of cloud service providers who are deemed capable of performing a network computing task in lieu of the task being performed by the network and may further comprise a price qualified roster each member of which is a cloud service provider: (a) whose price for performing the task complies with a price acceptability criteria or (b) that has a respective price proposal associated therewith reflecting a price for engaging the cloud service provider to perform the task in lieu of the task being performed by the network. Moreover, this price qualified roster can be displayed in a format suitable for the network operator to, at the least, have a display of each alternative task performer in the price qualified set and its respective price proposal that reflects a price for engaging the alternative task performer to perform the task in lieu of the task being performed by the network. It is to be understood that the term "display" is used in a broad sense and encompasses all forms of communication in visual, aural, and tactile format and including both human—and machine-interface variations.

Figure 4:
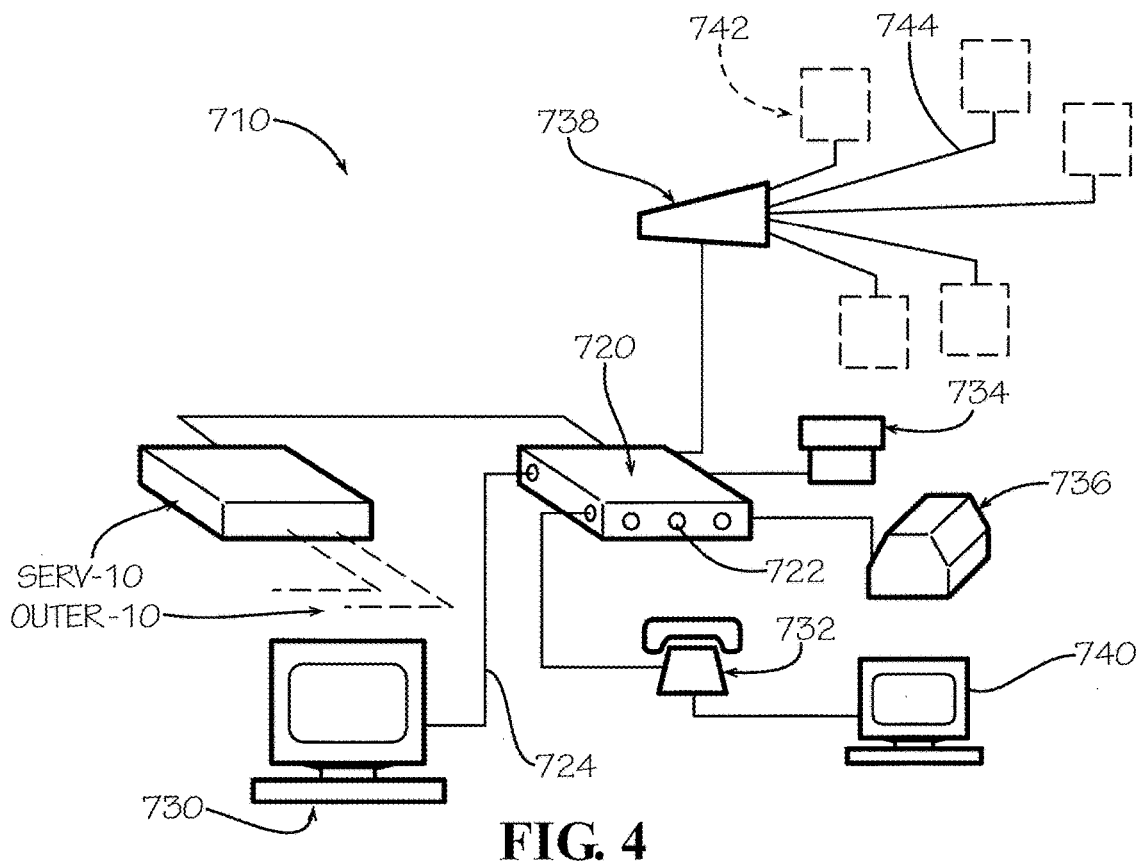
FIG. 4 is a schematic view of one exemplary subnetwork of the network shown in FIG. 2.

Reference is now had to FIG. 4, which is a schematic view of one exemplary subnetwork of the network, in connection with a description of the performance of the critical interface evaluating method 310 to evaluate the network 220. As seen in FIG. 4, a subnetwork 710 of the network 220 includes a router 720 that is operationally connection to a VMWare ESX server of the network, designated as SERV-10, which is a virtualization technology hardware item. The VMWare ESX server SERV-10 of the network is not comprised in the subnetwork 710. The VMWare ESX server SERV-10 is connected to other network devices (not shown) via a plurality of outer communication links OUTER-10 shown in broken lines.

The router 720 of the subnetwork 710 is a network device of the network and is operationally connected to a number of other network devices via ports 722 integrally formed in the router. For the sake of simplicity of illustration, each port 722 is shown as capable of handling a communication input from a single network device. The communication input from each such respective single network device to a given port 722 is transmitted via a cable 724. Each cable 724 is secured to a respective port 722 and also secured to a respective single network device.

The network devices to which the cables 724 are connected comprise a stand-alone computer terminal 730 (which may be a CRT, a telephony device, a laptop computer, etc.), a modem 732 having a computer terminal 740 operatively connected to it (the computer terminal 740 itself is not directly connected to the router 720), a printer 734, a workstation 736, and an access port 738. In addition to its connection with the router 720, the access port 738 is connected to five other network devices 742 (shown in broken lines) via a plurality of further cables 744.

The router 720, the stand-alone computer terminal 730, the modem 732, the thereto connected computer terminal 740, the printer 734, the workstation 736, and the access port 738 each have a MAC address. An execution or performance of the step of the critical interface evaluating method 310 would yield an identification of the router 720, the stand-alone computer terminal 730, the modem 732, the thereto connected computer terminal 740, the printer 734, the workstation 736, and the access port 738 as well as an identification of those entity applications associated with these network devices. The identification of these system assets can be effected in any suitable manner including, for example, known approaches for developing an inventory of network devices such as "pinging" feedback approaches, approaches for referencing a pre-existing network device inventory listing, and approaches for inferring the presence of network devices based upon network traffic analysis. The identification step can make use of any known network discovery approaches such as, for example, monitoring and assessment of network packets transmitted through the network. Alternatively or additionally, the selected network discovery approach can monitor, for example, Transmission Control Protocol/Internet Protocol (TCP/IP) or any other suitable network protocol activity on the network.

Following the execution or performance of the step of the critical interface evaluating method 310 of identifying system assets of the network, a user can then execute or perform the further step of the critical interface evaluating method 310 of applying a reference group heuristic and this step could yield the following results. For the sake of illustration, it is specified that the reference group heuristic dictates that an identified network device is deemed to be in the reference group if the identified network device itself has a MAC address and, additionally, has a non-intermediated communication relationship with two or more other network devices that themselves each have a MAC address. The application of the reference group heuristic in this manner to the identified network devices of the subnetwork (comprising the stand-alone computer terminal 730, the modem 732, the thereto connected computer terminal 740, the printer 734, and the workstation 736) would result in a determination that the stand-alone computer terminal 730 does not satisfy the reference group heuristic for the reason that this network device does not have a non-intermediated communication relationship with two or more other network devices that themselves each have a MAC address. Additionally, the application of the reference group heuristic would lead to a similar determination with respect to the printer 734 and the workstation 736—namely, neither of these two identified network devices satisfy the reference group heuristic for the reason that neither one of these network devices have a non-intermediated communication relationship with two or more other network devices that themselves each have a MAC address. Furthermore, with regard to the modem 732, although this network device has a non-intermediated communication relationship with another network device that itself has a MAC address (e.g., the computer terminal 740), this single non-intermediated communication relationship with one other network device does not satisfy the reference group heuristic—i.e., a single non-intermediated communication relationship with one other network device does not satisfy the requirement of the reference group heuristic of "a non-intermediated communication relationship with two or more other network devices that themselves each have a MAC address."

With regard to the access port 738, in the event that the access port is in a non-intermediated communication relationship with at least two of the network devices connected to the further cables 740, whereupon a determination will be made that the access port 738 satisfies the reference group heuristic for the reason that this access port does, in fact, have a non-intermediated communication relationship with two or more other network devices that themselves each have a MAC address (the other network devices 742). For purposes of the example, it is assumed that the access port 738 is in a non-intermediated communication relationship with all five of the respective network devices 742 connected to the further cables 744 and so the step of applying a reference group heuristic yields the determination that the access port 738 satisfies the reference group heuristic for the reason that this access port does, in fact, have a non-intermediated communication relationship with two or more other network devices that themselves each have a MAC address.

An evaluation report can be created in the form of a visual symbolic representation of system assets including the network devices that are members of the reference group, as determined via the method of the present invention. The evaluation reports can be created to be presented in addition to the visual symbolic representation of the subnetwork. Additionally, the visual symbolic representation of system assets can be populated with other information that may be of use to an administrator including visual symbolic representations of entity applications as well as textual or visual information about the IT configuration of the network including routing tables or port assignments, for example. The types of network devices that may typically be members of the reference group may include, for example, servers, routers, infrastructure uplinks, and shared uplinks.

A network operator may view the evaluation report via a terminal or a workstation, each of which may deploy a number of graphical user interfaces to display pictorials, graphs, or other visual elements that facilitate comprehension and readability of the evaluation report. Additionally, data comprised in the evaluation report, including the catalog of suggested references groups, may be communicated to other resources of the network such as servers or storage resources such as databases.

The evaluation report can also be edited or supplemented by a network operator and formatted for downstream presentation to others such as, for example, other decision makers involved in overseeing and managing the network. Such downstream presentations can be in form of dashboard presentations and include visual cues such as, for example, color coded tabs or hyperlink tabs for indicating access to, for example, more details about a particular critical interface. Additionally, the evaluation report can be archived with past and future evaluation reports and dashboard presentations can be generated with reference to such archives to reveal, for example, trends or repeated variances from desired performance goals.

With reference again to FIG. 1, it can be seen that the critical interface evaluating method 310 can include additional steps to produce useful IT management or IT build out tools for a network operator. As an example, the critical interface evaluating method 310 can include additional steps that lead to the creation of a first set of system assets of a reference group 640 and a second set of system assets of a reference group 642, with each set of system assets of a reference group being a reference group of critical interfaces determined for a respective subnetwork of the network 220. The first set of system assets of a reference group 640 and the second set of system assets of a reference group 642 can be analyzed independently or in comparison to one another for the purpose, for example, of evaluating various migration scenarios and the content or a summary of this analysis can be presented to a network operator in a report 644. The report 644 can be displayed, if desired, on a graphical user interface 646 and/or can be presented in any suitable human readable form.

As can be appreciated, the critical interface evaluating method 310 can advantageously provide insights into the performance of the in-place network 220 and these performance insights can be leveraged to assist the operator of the in-place network 220 to make information technology (IT) management decisions such as, for example, decisions relating to replacing or upgrading system assets and including decisions about replacing some or all of the functionality of system assets via migration of selected network functions to a location external of the network—i.e., migration to a public or private cloud. For example, the critical interface evaluating method 310 can yield information that can assist in a cloud migration decision, including generating a selection of migration scenarios each of which is a scenario wherein some or all of the functions performed by some or all of the system assets were instead to be performed at a location external to the network. Additionally, the critical interface evaluating method 310 can yield information that can assist in a cloud migration decision that includes generating a migration consideration set comprised of cost information units that each include cost information about one of the migration scenarios.

The present invention contemplates that, in a given scenario, a network operator may choose to engage a third party to apply the method of the present invention to evaluate a network. In such a scenario, the third party may deploy a user interface to produce a price qualified roster accessible to a network operator, wherein the price qualified roster displays the offerings of various "alternative task performers" (i.e., cloud service providers) with regard to the migration scenario of interest. A dashboard platform can be provided for displaying information about the price qualified rosters obtained via the method of the present invention and such a display can provide an intentionally ordered presentation of the alternative task performers in the price qualified roster with such presentation being communicated visually and/or aurally to the network operator. The intentionally ordered presentation of the alternative task performer or performers in the price qualified roster may be arranged, for example, so as to provide the network operator with a hierarchal listing of the alternative task performer or performers in the price qualified roster. As another example, the alternative task performer or performers in the price qualified roster may be so arranged, for example, so as to provide the network operator with a hierarchal listing of the alternative task performer or performers in the price qualified roster based upon directing the network operator to preferred resources that can help resolve metrics issues or capitalize upon identified opportunities. Further in this connection, the preferred resources can be comprised of vendors who have a particular capability such as, for example, cloud service providers having a particular capability, or vendors who are given preference relative to other vendors based upon a sponsorship criteria (i.e., "sponsoring" vendors are given a preferential showing in the display provided by the dashboard platform 470 as opposed to "non-sponsoring" vendors).

In accordance with one variant for displaying the price qualified roster, with particular application in the context of cloud service providers who agree to be "sponsoring" cloud service providers, cloud service providers may create and manage their listings through a user interface that permits the creation of one or more listing formats, the selection of details to associate with the listings, and an insert template that governs how and in which situations a listing will be displayed to a network operator. The cloud service provider may enter additional pieces of information and functionality pertaining to each listing. The cloud service provider may choose that a given listing be targeted only a discrete group of network operators, such as those meeting a set of customer demographics. Cloud service providers may set the specific price at which they are willing to offer their cloud services such as, for example, a single price or a price range for a "computing unit." If desired, cloud service providers may have the ability to be apprised of the price offerings of other cloud service providers in order, for example, to ensure that their listing appears in a desired position or to optimize the "click-through" response or contact response of the listing.

The method of the present invention can be executed manually but is preferably executed via a tangible computer-readable medium for controlling a computing device to generate an output. This tangible computer-readable medium may be connected (e.g., networked) to other machines in a Local Area Network (LAN), an intranet, an extranet, or the Internet. The tangible computer-readable medium may operate in the capacity of a server or a client machine in a client-server network environment, or as a peer machine in a peer-to-peer (or distributed) network environment. The tangible computer-readable medium may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to execute the steps of the method of the present invention.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated by a computer system. It will be convenient at times, principally for reasons of common usage, to refer to the above-referenced signals as bits, values, elements, symbols, characters, terms, numbers or the like. It should be borne in mind, however, that all of these and similar terms are to be associated with the appropriate physical quantities and are merely convenient labels applied to these quantities.

Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Further, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Java object-oriented environment and the like. In general, however, all of the aforementioned terms as used herein are meant to encompass any series of logical steps performed in a sequence to accomplish a given purpose.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software.

One of ordinary skill in the art will immediately appreciate that the invention can be practiced with computer system configurations of any type, including hand-held devices, multiprocessor systems, microprocessor-based or programmable consumer electronics, DSP devices, network PCs, minicomputers, mainframe computers, personal computers, and the like. The invention can also be practiced in distributed computing environments where tasks are performed by remote processing devices that are linked through a communications network.

What is claimed is:

1. A computer-implemented method comprising, as performed by one or more computing devices configured with computer-executable instructions:
    monitoring communications among network resources of a networked environment to generate monitoring data, wherein the network resources include a plurality of network devices and a plurality of applications;
    identifying, based at least partly on the monitoring data, media access control addresses (MAC addresses) corresponding to the plurality of network devices, wherein the plurality of network devices and the plurality of applications distribute the communications among the network resources using the MAC addresses;
    identifying one or more non-intermediated communication relationships based at least partly on the MAC addresses, wherein a non-intermediated communication relationship comprises a first network resource associated with a first MAC address of the MAC addresses communicatively connected to at least a second network resource associated with a second MAC address of the MAC addresses without any network resource, communicatively intermediate the first network resource and the second network resource, associated with a MAC address;
    determining individual network resources are in a reference group of network resources based at least partly on the individual network resources in the reference group of network resources each having non-intermediated communication relationships with at least a threshold number of network resources;
    identifying the first network resource as a critical interface based at least partly on the first network resources being an individual network resource being in non-intermediated communication relationships with the threshold number of network resources from the reference group of network resources, and based at least partly on data communicated via the first network resource; and
    performing a migration action based at least partly on the first network resource being the critical interface.

2. The computer-implemented method of claim 1, further comprising: assessing traffic analytics data relative to a selection of migration scenarios; and generating a migration consideration set comprising plurality of cloud service providers capable of performing a network computing task in lieu of the network computing task being performed by the networked environment.

3. The computer-implemented method of claim 2, wherein performing the migration action comprises displaying a user interface comprising information regarding the migration consideration set.

4. The computer-implemented method of claim 2, wherein performing the migration action comprises causing migration of the network computing task to a cloud service provider of the plurality of cloud service providers, wherein the cloud service provider performs the network computing task in lieu of the network computing task being performed by the networked environment.

5. The computer-implemented method of claim 1, further comprising analyzing data regarding one or more migration scenarios, wherein identifying the first network resource for migration to the second networked environment is based on a migration scenario of the one or more migration scenarios.

6. The computer-implemented method of claim 1, further comprising determining that the first network resource communicates data regarding an operational status of the networked environment.

7. The computer-implemented method of claim 1, further comprising determining that in a communication link between the first network resource associated with the first MAC address and the second network resource associated with the second MAC address, there is no network resource, intermediate the first network resource and the second network resource, associated with any MAC address.

8. The computer-implemented method of claim 1, further comprising displaying a user interface comprising information regarding the reference group of network resources.

9. A system comprising:
    computer-readable memory storing computer-executable instructions; and
    one or more processors in communication with the computer-readable memory and configured by the computer-executable instructions to at least:
    monitor communications among network resources of a networked environment to generate monitoring data, wherein the network resources include a plurality of network devices and a plurality of applications;
    identify, based at least partly on the monitoring data, media access control addresses (MAC addresses) corresponding to the plurality of network devices, wherein the plurality of network devices and the plurality of applications distribute the communications among the network resources using the MAC addresses;
    identify one or more non-intermediated communication relationships based at least partly on the MAC addresses, wherein a non-intermediated communication relationship comprises a first network resource associated with a first MAC address of the MAC addresses communicatively connected to at least a second network resource associated with a second MAC address of the MAC addresses without any network resource, communicatively intermediate the first network resource and the second network resource, associated with a MAC address;
    determine individual network resources are in a reference group of network resources based at least partly on the individual network resources in the reference group of network resources each having non-intermediated communication relationships with at least a threshold number of network resources;
    identify the first network resource as a critical interface based at least partly on the first network resource being an individual network resource being in non-intermediated communication relationships with a threshold number of network resources from the reference group of network resources, and based at least partly on data communicated via the first network resource; and perform a migration action based at least partly on the first network resource being the critical interface.

10. The system of claim 9, wherein the one or more processors are programmed by further executable instructions to: assess traffic analytics data relative to a selection of migration scenarios; and
   generate a migration consideration set comprising plurality of cloud service providers capable of performing a network computing task in lieu of the network computing task being performed by the networked environment.

11. The system of claim 10, wherein to perform the migration action, the one or more processors are programmed by further executable instructions to display a user interface comprising information regarding the migration consideration set.

12. The system of claim 10, wherein to perform the migration action, the one or more processors are programmed by further executable instructions to cause migration of the network computing task to a cloud service provider of the plurality of cloud service providers, wherein the cloud service provider performs the network computing task in lieu of the network computing task being performed by the networked environment.

13. The system of claim 9, wherein the one or more processors are programmed by further executable instructions to analyze data regarding one or more migration scenarios, wherein the first network resource is identified for migration to the second networked environment based on a migration scenario of the one or more migration scenarios.

14. The system of claim 9, wherein the one or more processors are programmed by further executable instructions to:
   determine that the first network resource communicates data regarding an operational status of the networked environment.

15. The system of claim 9, wherein the one or more processors are programmed by further executable instructions to determine that in a communication link between the first network resource associated with the first MAC address and the second network resource associated with the second MAC address, there is no network resource, intermediate the first network resource and the second network resource, associated with any MAC address.

16. The system of claim 9, wherein the one or more processors are programmed by further executable instructions to display a user interface comprising information regarding the reference group of network resources.

17. The system of claim 9, wherein the reference group of network resources comprises a hierarchical listing of network resources.

* * * * *

UNITED STATES PATENT AND TRADEMARK OFFICE
CERTIFICATE OF CORRECTION

PATENT NO. : 11,936,536 B2
APPLICATION NO. : 17/510279
DATED : March 19, 2024
INVENTOR(S) : Jeremy Lynn Littlejohn et al.

It is certified that error appears in the above-identified patent and that said Letters Patent is hereby corrected as shown below:

On the Title Page

Column 2 (Abstract), Line 1, delete "a method a method" and insert -- a method --.

In the Specification

Column 3, Line 60-61, delete "can provide can provide" and insert -- can provide --.

Column 4, Line 34, delete "mayor" and insert -- may or --.

Column 4, Line 50, delete "networks" and insert -- networks. --.

Column 6, Line 47, delete "Windows"" and insert -- Windows™ --.

Column 7, Line 38, delete "IS"" and insert -- is --.

Column 9, Line 13, delete "SMNP" and insert -- SNMP --.

Signed and Sealed this
Fourth Day of June, 2024

Katherine Kelly Vidal
*Director of the United States Patent and Trademark Office*